United States Patent

[11] 3,581,908

| [72] | Inventors | William M. Pearson; |
| | | Winfred J. Sorge, both of Green Bay, Wis. |
| [21] | Appl. No. | 851,244 |
| [22] | Filed | Aug. 19, 1969 |
| [45] | Patented | June 1, 1971 |
| [73] | Assignee | Northwest Engineering Corporation |
| | | Green Bay, Wis. |

[54] LOGGING MACHINE WITH EMERGENCY BRAKE
8 Claims, 3 Drawing Figs.

[52] U.S. Cl. .................................................. 212/59,
188/170, 192/3, 212/38, 212/68
[51] Int. Cl. ................................................ B66c 23/06
[50] Field of Search ......................................... 188/170;
192/3; 303/19, 69; 212/38, 59, 68

[56] References Cited
UNITED STATES PATENTS

| 2,372,311 | 3/1945 | Brown | 188/170X |
| 2,409,908 | 10/1946 | Simpkins | 188/170X |
| 2,506,842 | 5/1950 | Rockwell | 188/170X |
| 3,280,401 | 10/1966 | Cook et al. | 303/19X |

*Primary Examiner*—Duane A. Reger
*Attorney*—Andrus, Sceales, Starke & Sawall

ABSTRACT: A logging machine having emergency brakes which are normally spring biased into engagement and which are disengaged by air pressure. The brakes are connected through a pedal-operated brake control valve and a hand-operated swing-travel control valve to a source of pressurized air. When the latter valve is in the travel mode and the pedal valve is held open by the foot, air disengages the brakes. When the pedal is released, air is exhausted from the line between the pedal valve and brakes to set them. Quick release valves in said line provide fast independent exhausting of separate line sections.

PATENTED JUN 1 1971
3,581,908
SHEET 1 OF 2
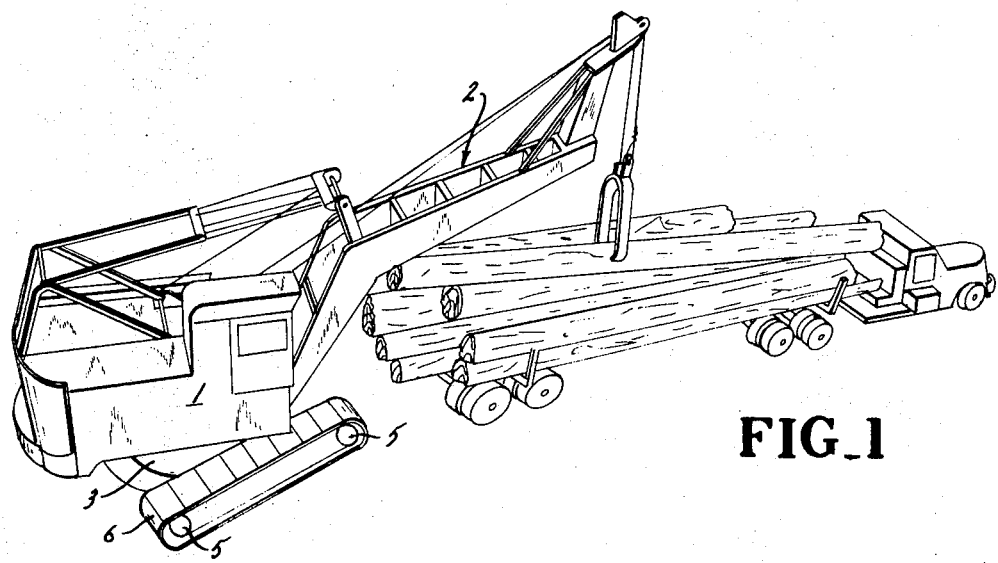
FIG_1
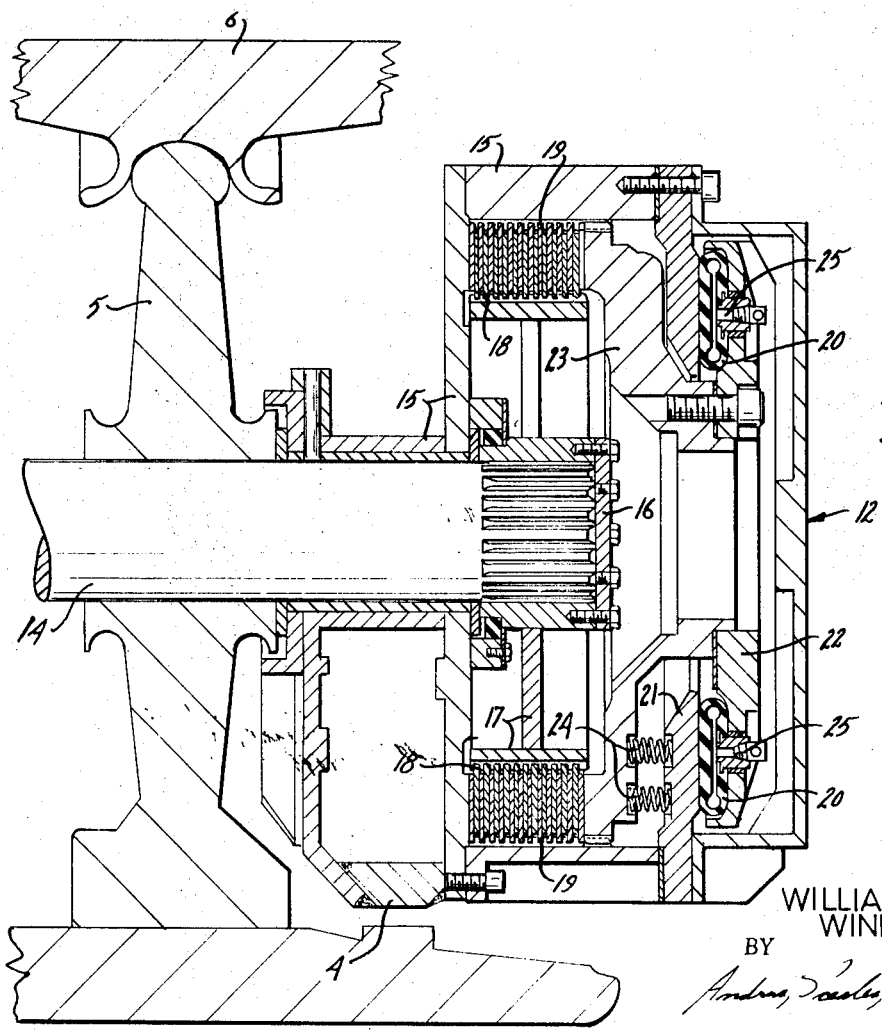
FIG_2
INVENTORS
WILLIAM M. PEARSON
WINFRED J. SORGE
BY
*Andrus, Sceales, Starke & Sawall*
Attorneys

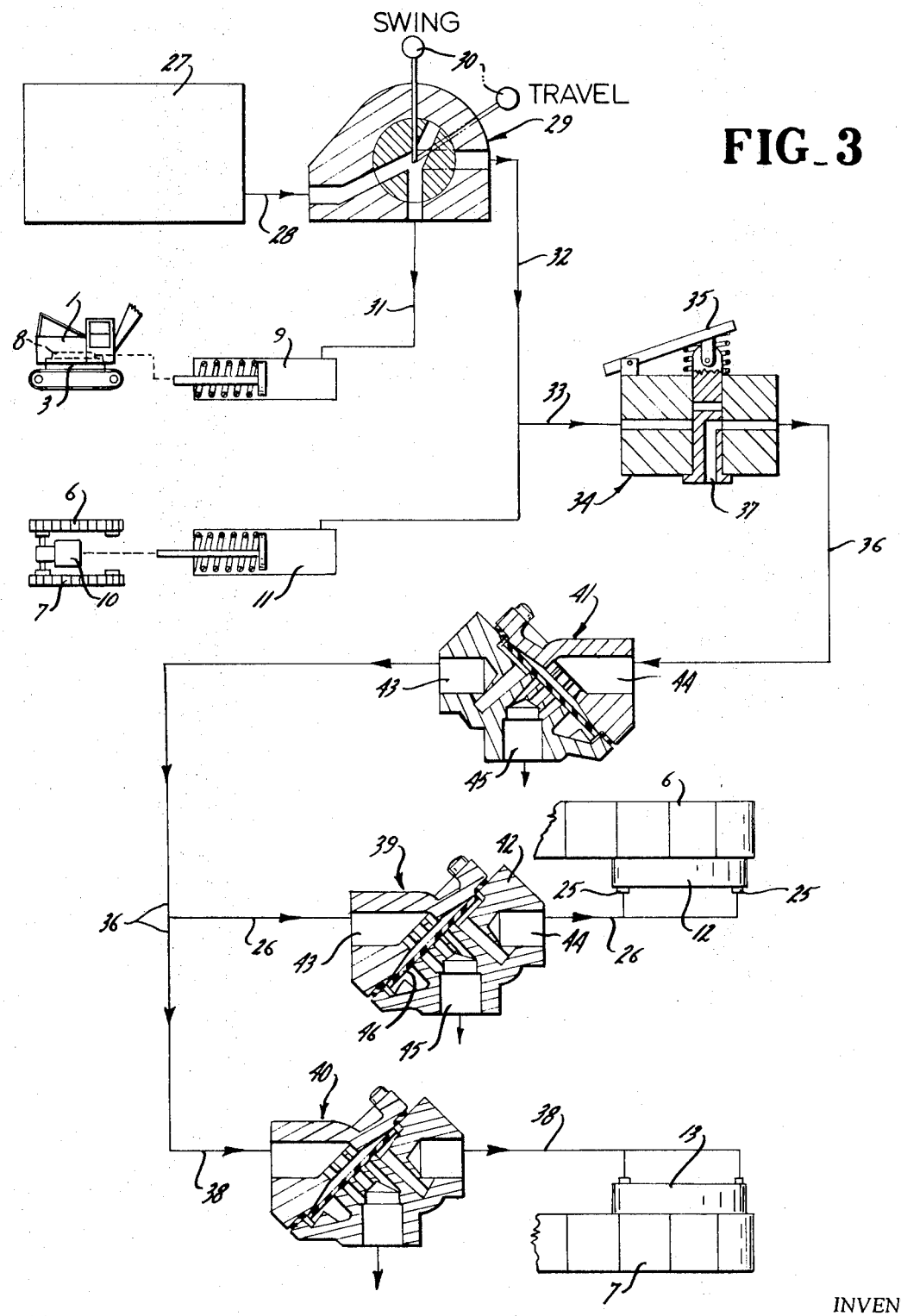
FIG_3

LOGGING MACHINE WITH EMERGENCY BRAKE

BACKGROUND OF THE INVENTION

This invention relates to logging machines and safety apparatus therefore.

Logging machines such as shovel log loaders, yarders and the like are often used in relatively rough terrain. Since they are relatively large, heavy and cumbersome, they will occasionally tend to overrun the drive mechanism and "get away" from the operator. Safety mechanisms on such logging machines have usually included a hand-operated safety brake which was manually actuated by the operator to bring the machine to a halt.

It has been found that in extremely steep terrain, such as 30 percent grades, hand-operated safety brake actuation is often not adequate. If a machine starts to run away, several seconds are needed to actuate the safety brake by hand, and by this time the machine may be moving downhill at 20 ft./sec. or faster.

SUMMARY OF THE INVENTION

The present invention solves the aforementioned problem and replaces the hand control with a foot control which substantially reduces the time from runaway to emergency brake application. The foot control is of the dead man type; i.e. the brake is applied when the foot is released. In addition, the device of the invention contemplates a substantially instant brake application.

DESCRIPTION OF THE DRAWINGS

The accompanying drawings illustrate the best mode presently contemplated by the inventors for carrying out the invention.

In the drawings:

FIG. 1 is a perspective view of a logging machine which incorporates the invention;

FIG. 2 is a central section through the brake mechanism; and

FIG. 3 is a schematic diagram showing the circuit for the brake.

DESCRIPTION OF THE PREFERRED EMBODIMENT

As shown in FIG. 1 of the drawings, the invention is utilized in connection with a mobile crawler-type logging machine having an operator's cab 1 and a boom assembly 2, both of which are swingable on a turntable 3 about a vertical axis. Turntable 3 is mounted on a suitable machine chassis or frame 4 which also supports four rotatable crawler sprockets 5. Sprockets 5 serve to secure and drive rotatable members such as left and right endless crawler belts 6 and 7 for maneuvering the machine over the terrain.

The means for rotating turntable 3 and for drivingly rotating sprockets 5 are, for the most part, conventional. Suffice it to say that turntable 3 is rotated by a drive which includes a clutch 8 which is actuated by a control cylinder 9; and belts 6 and 7 are rotated by a drive which includes a clutch 10 which is actuated by a control cylinder 11. See FIG. 3.

The machine also includes a conventional braking system, not shown.

In accordance with the invention, auxiliary emergency or safety brake means are provided to assist in preventing or stopping sudden runaway action of the machine on a steep slope. FIG. 3 shows left and right front brakes 12 and 13, although rear breaks might also be utilized. A detailed view of a suitable brake 12 is shown in FIG. 2, brake 13 being similar.

As shown in FIG. 2, brake 12 is adapted for connection to the outer end portion of the idler shaft 14 for sprocket 5. The brake includes a bearing housing assembly 15 which is suitably fixed to frame 4 and through which shaft 14 extends. An end cap 16 is mounted for rotation with shaft 14 and includes an annular gear 17 to which the drive plates 18 of the brake are keyed. Friction discs 19 are disposed between plates 18 and are suitably keyed to housing assembly 15. Plates 18 and discs 19 form the actual brake assembly which is longitudinally slideable.

The brake is of the type which is normally engaged, but is disengaged upon the application of power. For this purpose, an annular collapsible expandible resilient air tube 20 is confined between a fixed pressure plate 21 secured to housing assembly 15 and a longitudinally movable pressure plate 22. Plate 22 is connected to a longitudinally movable spacer 23 which is keyed to housing assembly 15 and which is engageable with the outermost set of friction discs 19. A plurality of circumferentially spaced pairs of springs 24 extend between pressure plate 21 and spacer 23 to bias the brake into fully engaged position.

Tube 20 is connected via suitable inlet ports 25 to an air inlet line 26. As air under pressure is supplied to tube 20, as will be described, it expands tube 20 to overcome the biasing force of springs 24 to release the brake.

The invention contemplates foot-operated means to maintain brakes 12 and 13 in disengaged condition during normal travel operation of the machine. This means includes a pneumatic circuit, shown in FIG. 3, wherein a gas such as air under pressure is supplied from a manifold 27 or other suitable source through a line 28 to hand-operated swing-travel control valve 29 in cab 1.

One position of the handle 30 of valve 29 passes air through a line 31 to cylinder 9 for clutch 8. Cylinder 9 is spring loaded to normally disengage clutch 8, but when handle 30 is in the "swing" position, cylinder 9 will cause clutch 8 to engage to rotate turntable 3. When handle 30 is in the other, or "travel" position, air passes through a line 32 to cylinder 11 for clutch 10. Cylinder 11 is also spring loaded to normally disengage clutch 10, but placement of handle 30 in the "travel" position will cause clutch 10 to be engaged by cylinder 11 to drive belts 6 and 7.

Air lines 31 and 32 are independent so that movement of handle 30 will cause actuation of the travel mode independent from the swing mode.

The emergency brake system is responsive to the travel mode. For this purpose, a branch air line 33 leads from line 32 to a brake control valve, shown generally at 34. Valve 34 is positioned in cab 1 and is provided with a movable pedal 35 for engagement by the operator's foot. As shown, pedal 35 is spring biased to a normal upward position wherein air from line 33 cannot pass through the valve and wherein air in an outlet air line 36 can exhaust through a valve discharge port 37. When pedal 35 is pressed down to overcome the spring biasing force, air under pressure passes from line 33 to line 36 and port 37 is blocked off.

Air line 36 is connected to brake 12 through branch line 26 and to brake 13 through a branch line 38. For purposes to be described, quick release valve means are provided between valve 34 and the brakes to provide an extremely fast exhaust of air in the connecting air lines For this purpose, quick release valve 39 and 40 are disposed in lines 26 and 38 very closely adjacent brakes 12 and 13 respectively. An additional quick release valve 41 is disposed at the midportion of line 36.

Valves 39, 40 and 41 are substantially identical. As shown in FIG. 3, a valve 39 comprises a housing 42 and inlet, outlet and exhaust ports 43, 44 and 45 respectively. A movable diaphragm 46 is responsive to a pressure differential between line 36 and air tube 20 to pass air into brake 12 or exhaust it quickly through port 45.

When the machine is being operated in the swing mode, it is not traveling and no air passes through line 36, even if pedal 35 is depressed. In such a situation, brakes 12 and 13 are automatically applied by springs 24. When control valve handle 30 is moved to the travel mode and the machine is ready to begin moving, the operator pushes pedal 35 down and maintains it there. Pressurized air will pass through lines 32 and 33, through valve 34 to lines 36, 26 and 38 to inflate tubes 20 to disengage brakes 12 and 13. Diaphragms 46 will move to permit this flow.

In the event the machine starts running away or the operator becomes incapacitated, the operator's foot will release pedal 35, closing off line 33 and opening the adjacent portion of line 36 to exhaust through port 37. The lowering of pressure in the upstream portion of line 36 will cause quick release valve 41 to instantly open the downstream portion of line 36 to exhaust through its port 45. This causes valves 39 and 40 to likewise instantly exhaust air from tubes 20 to automatically reengage brakes 12 and 13.

The length of the air line connection between valve 34 and the brakes is such that, without the quick release valves, air would take too long to exhaust through port 37 before tubes 20 would be deflated. By providing quick release valves positioned as shown in FIG. 3, small independent segments of the connecting air line are simultaneously and much more quickly exhausted. In addition, there is substantially no dragging of the brakes, and they are instantly set.

The invention provides a substantially improved logging machine which is safer than those previously known.

Various modes of carrying out the invention are contemplated by the inventors.

The following claims particularly point out and distinctly claim the subject matter which is regarded as the invention.

We claim:

1. In a logging machine having rotatable members driven for causing the machine to travel over logging terrain, an emergency brake system comprising:
   a. a source of pressurized air,
   b. normally engaged airbrake means connected to said members, said brake means being releasable in response to air pressure,
   c. air line means connecting said source with said brake means,
   d. a first control valve in said air line means with said first valve being movable to a travel position for driving said rotatable members for supplying air to said brake means,
   e. and a second control valve connected in said air line means between said first valve and said brake means,
   f. means to bias said second valve to a normally closed position to disconnect said first valve from said brake means,
   g. and a movable foot pedal connected to said second valve for overcoming said biasing means to connect said first valve with said brake means to thereby disengage said brake means when said first valve is in said travel position.

2. The machine of claim 1 in which said brake system includes: means to exhaust said air line means downstream of said second valve when said foot pedal is released to thereby automatically reengage said brake means.

3. The machine of claim 2 in which said exhaust means is positioned and constructed to simultaneously exhaust independent segments of said air line means downstream from said second valve.

4. The machine of claim 2 in which said exhaust means comprises:
   a. an exhaust port in said second valve,
   b. said port being disconnected from said air line means when said foot pedal is moved to overcome said biasing means,
   c. said port being connected to the downstream side of said second valve when the latter is in a normally closed position.

5. The machine of claim 2 in which said exhaust means includes:
   a. quick release valve means disposed in said air line between said second valve and said brake means,
   b. said quick release valve means being responsive to a pressure differential in said air line to exhaust air downstream from said quick release valve means when said second valve is moved from an open to a closed position.

6. The machine of claim 2 in which said exhaust means comprises:
   a. an exhaust port in said second valve,
   b. said port being disconnected from said air line means when said foot pedal is moved to overcome said biasing means,
   c. said port being connected to the downstream side of said second valve when the latter is in a normally closed position,
   d. and quick release valve means disposed in said air line between said second valve and said brake means,
   e. said quick release valve means being responsive to a pressure differential in said air line to exhaust air downstream from said quick release valve means when said second valve is moved from an open to a closed position.

7. The machine of claim 3 in which said exhaust means comprises:
   a. an exhaust port in said second valve,
   b. said port being disconnected from said air line means when said foot pedal is moved to overcome said biasing means,
   c. said port being connected to the downstream side of said second valve when the latter is in a normally closed position,
   d. a first quick release valve disposed in the midportion of said air line between said second control valve and said brake means,
   e. and a second quick release valve disposed in said air line closely adjacent said brake means,
   f. said quick release valves being responsive to a pressure differential in said air line to exhaust air downstream from each said quick release valve when said second valve is moved from an open to a closed position.

8. In a logging machine having a boom assembly and swing means for rotating said assembly about a vertical axis, and having rotatable members driven for causing the machine to travel over logging terrain, an emergency brake system comprising:
   a. a source of pressurized air,
   b. normally engaged brake means connected to said members, said brake means being disengageable in response to air pressure,
   c. air line means connecting said source with said brake means,
   d. a first control valve in said air line means, said first valve being connected to said swing means and being movable between a swing position for actuating said swing means and a travel position for driving said rotatable members and for supplying air to said brake means,
   e. a second control valve disposed in said air line between said first valve and said brake means,
   f. means to bias said second valve to a normally closed position to disconnect said first valve from said brake means,
   g. and a movable foot pedal connected to said second valve for overcoming said biasing means to connect said source with said brake means and thereby disengage said brake only when said first valve is in said travel position.

UNITED STATES PATENT OFFICE
CERTIFICATE OF CORRECTION

Patent No. 3,581,908            Dated   June 1, 1971

Inventor(s)    Pearson et al

It is certified that error appears in the above-identified patent and that said Letters Patent are hereby corrected as shown below:

Column 3, line 36, after "members" and before "for" insert ---and---

Column 3, line 37, cancel "and" after "e." at the beginning of the sentence

Signed and sealed this 9th day of November 1971.

(SEAL)
Attest:

EDWARD M. FLETCHER, JR.        ROBERT GOTTSCHALK
Attesting Officer               Acting Commissioner of Patents